Oct. 2, 1962 W. J. GREENLEAF 3,056,186
ROTARY CUTTING TOOL
Filed Jan. 12, 1962
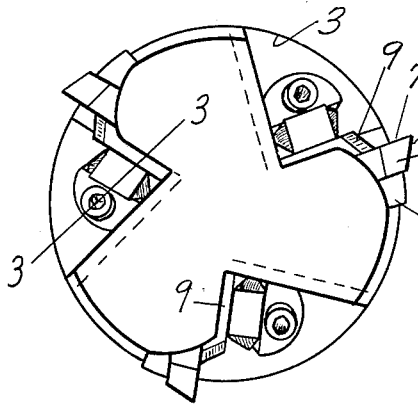
FIG. 2
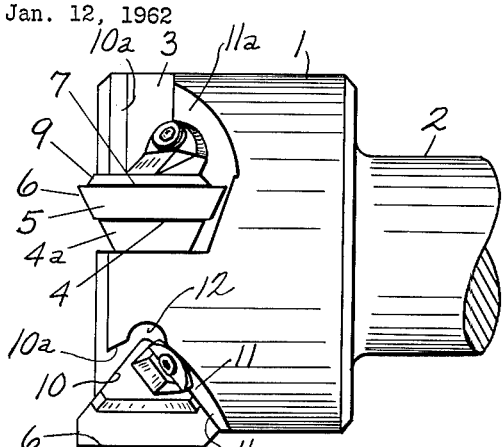
FIG. 1
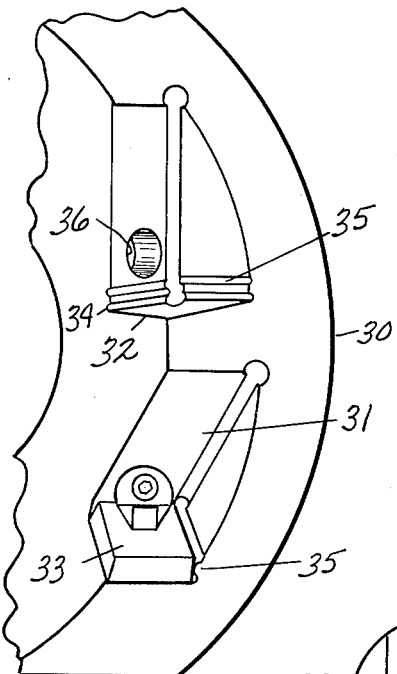
FIG. 6
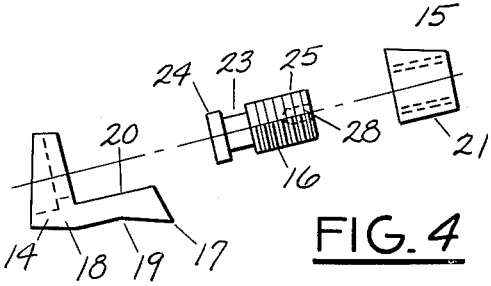
FIG. 3
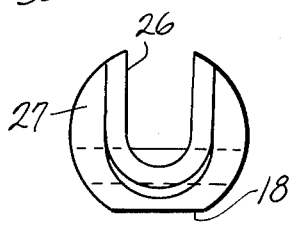
FIG. 5
FIG. 4
INVENTOR.
Walter J. Greenleaf
BY
Ralph Harmon
Attorney

United States Patent Office 3,056,186
Patented Oct. 2, 1962

3,056,186
ROTARY CUTTING TOOL
Walter J. Greenleaf, R.D. 3, Meadville, Pa.
Filed Jan. 12, 1962, Ser. No. 165,863
6 Claims. (Cl. 29—105)

This invention is advantageous in rotary cutting or boring tools. It combines the advantage of a wedge lock for indexable blades with increased cutting clearance and rigidity of the body of the tool.

Each blade is received in a notch in the body of the tool. In the bottom of the notch is an end seat for the blade and side seats for locating the blade. Each blade is locked against its end seat by a single wedge lock received in a hole parallel to the bottom of the notch and having a nose projecting out over the blade to hold it against its end seat.

In the drawing, FIG. 1 is a side elevation of a boring tool, FIG. 2 is an end view, FIG. 3 is a section on line 3—3 of FIG. 2, FIG. 4 is an exploded view of the wedge lock, FIG. 5 is an end view of the body of the wedge lock, and FIG. 6 is a fragmentary perspective of a milling cutter.

The boring tool has a body 1 with a shank 2 at one end for connection to a drive. At the opposite end, the body has a plurality of notches 3 extending axially part way into the body. Each notch has a bottom face 4 in a plane extending axially and radially at the desired rake angles for a triangular blade 5 of hard metal such as one of the carbides. The face 4 provides the end seat for the blade 5 and takes the cutting thrust. An anvil 4a may be set into the bottom of the notch and provides the face 4. The blades have sides 6 in planes at 60 degrees to each other symmetrically disposed about the center of the blade. The sides 6 make an angle with the end face 7 of the blade providing the appropriate cutting clearance. For the cutter illustrated, which has 0 degree radial rake and 5 degrees positive axial rake, the sides 6 make an angle of less than 90 degrees with the end face 7 of the blade to provide clearance. The blades can accordingly be indexed to three different cutting positions. In cutters where the sides 6 are at right angles to the end face 7, the blades can also be turned end for end to provide a total of six cutting positions.

As shown in FIG. 1, the sides 6 of the blade are located by side seats 10 and 11 at 60 degrees to each other and in front of the end seat 4. The seats 10 and 11 can be formed at the same time that the end seat 4 is formed by a tool or grinding wheel with a spindle at right angles to the end seat. Holes 12 at the junction of the seats 10, 11 and 4 provide tool clearance for the seat forming tools. The seats 10 and 11 are spaced from the sides 10a and 11a of the notch. The side seats 10 and 11 are accurately formed for precision location of the blades. The sides 10a and 11a provide clearance for tools rotating on axes at right angles to the end seat 4. The depth of the side seats is sufficient to receive a chip breaker 9 and a blade 5. The chip breaker may be omitted.

At the back of each of the seats 4 is a hole 13, drilled into the body 1 on an axis parallel to the end seat 4. The rear portion 13a of the hole is of smaller diameter than the balance 13b of the hole and provides a land 13c receiving the body 14 of a wedge lock illustrated in FIGS. 4 and 5 consisting of a body 14, a wedge 15, and a screw 16. The diameter of the outer surface of the body 14 is substantially that of the reduced diameter rear portion 13a of the hole 13. The diameter of the outer surface of the wedge 15 is substantially that of front portion 13b of the hole 13. When inserted in the hole, the outer end of the wedge 15 is substantially flush or projects only slightly beyond the surface 11a of the notch 3. The wedge is accordingly well to the rear of chips removed by the blade. The body 14 has a projecting nose 17 which extends out over the chip breaker 9 and blade 4 and when the wedge is tightened, exerts a downward clamping force holding the blade back against the seat. The body 14 is free to rock about the land 13c because of the clearance provided by the front section of the hole. The clamping force from the wedge accordingly is transmitted directly to the nose 17. Although the nose projects forward of the surface 11a of the notch, it is still well back of the cutting edge of the blade and accordingly does not interfere with chips. The under side of the rear end of the body is flat as indicated at 18 so the lock can be inserted after the blade and chip breaker are in place and the under side of the nose 17 is relieved as indicated at 19 (FIGS. 3, 4) so the clamping force exerted on the bit is at the forward end of the nose.

On the upper surface of the body 14 of the lock is a flat 20 inclined upwardly from the back toward the front and mating with a complementary flat surface 21 on the under side of the wedge 15. The wedge is moved forward and back along the inclined surface 20 by the screw 16 having a neck 23 between the head 24 and the body 25 of the screw slidably received in a slot 26 in an upstanding web 27 at the back of the body 14 of the lock. At the front end of the screw is a socket 28 for a socket wrench by means of which the screw may be turned.

As the screw is turned in the direction to tighten the blade lock, the wedge 15 moves forward or up the inclined surface 20 and forces the nose 17 of the body tightly against the blade and clamps it against the blade seat 4. Because the body 14 fulcrums on land 13c and the outer surface of the body clears the front part 13b of the hole 13, all of the wedging force is transmitted to the nose 17, well forward of the underlying side seat 10 and far enough over the end seat 4 so there is no tendency for the blade to rock. The blade is released by turning the screw in the reverse direction.

The upper side of the wedge 15 has substantially the curvature of the front section 13b of the hole 13 so that a good bearing is obtained throughout the length of the wedge when the lock is tightened. There is a clearance between the body and the front section 13b of the hole so that the body does not lock against the side of the hole and interfere with the clamping action.

By reference to FIGS. 1 and 2 it can be seen that there is ample chip clearance. The notches 3 provide clearance in front of the cutting tips of the blades as is evident from FIGS. 1 and 2. The blade lock is at the bottom of the notch well out of the way of the chips. The nose 17 of the blade lock which extends forward over the blade is still well to the rear of the chips.

The milling cutter of FIG. 6 has a body 30 with notches 31 extending inward from the periphery of the body. At the bottom of each of the notches is a seat 32 for a cutting blade 33. In front of the seat 32 are side seats 34 and 35 engaging and locating adjacent sides of the blade. A blade lock of the construction previously described fits in a hole 36 extending in a direction parallel to the seat 32 and transverse to one of seats 34, 35. The blade is precisely located and oriented with the proper rake by the seats 32, 34, 35 and is clamped tightly against the seat 32 by the blade lock. Accordingly the blade may be indexed to bring successive cutting edges into cutting position with the accuracy required for milling cutters. The blade 33 is illustrated as square. Other polygonal shapes could be used.

In all of the cutters, the notches (3, 31) provide clearance for machining the blade seats and at the same time do not unduly weaken the body of the cutter. Each blade is held in place by a single wedge lock.

This application is a continuation-in-part of application Serial No. 6,196, now abandoned.

What is claimed as new is:

1. A rotary cutting tool comprising a body with a plurality of notches extending axially part way into one end of the body, each notch having sides extending from the outer surface of the body toward the center and having a bottom surface in a plane extending radially and axially at the rake angles desired providing an end seat for a symmetrical polygonal blade seated thereon and two side surfaces spaced inward of the sides of the notch and in planes intersecting said bottom surface, said side surfaces having an included angle therebetween equal to the angle between adjacent sides of the blade and providing side seats engaging adjacent sides of the blade, said body having a hole above and parallel to said bottom surface and extending into the body transverse to at least one of said sides of the notch, said hole having a larger diameter section at the front and a smaller diameter section at the back providing a land at the back, a wedge lock slidably received in said hole, said wedge lock having a body of curvature corresponding to said smaller diameter section fulcrumed on said land and with a nose projecting beyond said one side of the notch and out over and said end seat in clamping relation to the blade and with an inclined surface diverging from the blade on the side of the body opposite the blade, a wedge of curvature corresponding to said larger diameter section and slidably received in said larger diameter section of the hole and having a surface mating with said inclined surface, and a screw for moving the wedge along said inclined surface.

2. A rotary cutting tool comprising a body with a plurality of notches extending axially part way into one end of the body, each notch having sides extending from the outer surface of the body toward the center and having a bottom surface in a plane extending radially and axially at the rake angles desired providing an end seat for a symmetrical polygonal blade seated thereon and two side surfaces spaced inward of the sides of the notch and in planes intersecting said bottom surface, said side surfaces having an included angle therebetween equal to the angle between adjacent sides of the blade and providing side seats engaging adjacent sides of the blade, said body having a hole above and parallel to said bottom surface and extending into the body transverse to at least one of said sides of the notch, said hole having a larger diameter section at the front and a smaller diameter section at the back providing a land at the back, a wedge lock slidably received in said hole, said wedge lock having a body of curvature corresponding to said smaller diameter section fulcrumed on said land and with a nose projecting beyond said one side of the notch and out over and said end seat in clamping relation to the blade and with an inclined surface diverging from the blade on the side of the body opposite the blade, the side of the nose adjacent the blade being relieved so the clamping force exerted on the blade is at the forward end of the nose, a wedge of curvature corresponding to said larger diameter section and slidably received in said larger diameter section of the hole and having a surface mating with said inclined surface, and a screw for moving the wedge along said inclined surface.

3. A rotary cutting tool comprising a body with a plurality of notches extending axially part way into one end of the body, each notch having sides extending from the outer surface of the body toward the center and having a bottom surface in a plane extending radially and axially at the rake angles desired providing an end seat for a symmetrical polygonal blade seated thereon and two side surfaces in planes intersecting said bottom surface, said side surfaces having an included angle therebetween equal to the angle between adjacent sides of the blade and providing side seats engaging adjacent sides of the blade, said body having a hole above and parallel to said bottom surface and extending into the body transverse to at least one of said sides of the notch, a wedge lock slidably received in said hole, said wedge lock having a member with a nose projecting beyond said one side of the notch and engaging the blade, a fulcrum within the hole for the end of the member remote from the nose, said member having an inclined surface extending in front of the fulcrum and on the side of the member opposite the blade, a wedge slidably received in said hole between said fulcrum and said nose and having a surface mating with said inclined surface, and a screw for moving the wedge along said inclined surface.

4. A rotary cutting tool comprising a body, a plurality of flat symmetrical polygonal blades arranged around the axis of the body at the desired cutting angles, said body having a plurality of notches extending angularly into the body from the outer periphery of the body, each notch having a bottom surface providing an end seat for one of the blades, said notch having side seats having an included angle therebetween equal to the angle between adjacent sides of the blades and engaging adjacent sides of the blade, said body having a hole in front of and outside the projected area of the blade and outside said side seats, a blade lock slidably received in said hole, said blade lock having a body with a nose projecting out over the blade, said nose being relieved on the side adjacent the bit in back of its forward end so the engagement with the blade is at the forward end of the nose, the body of the blade lock having within said hole an inclined surface diverging from the blade on the side of the body opposite the blade, a wedge slidably received in said hole and having a surface mating with said inclined surface, and a screw for moving the wedge along said inclined surface.

5. A cutting tool comprising a body having an end seat for a polygonal blade and two side seats having an included angle therebetween equal to the angle between adjacent sides of a symmetrical polygonal blade seated on said end seat and engaging adjacent sides of the blade, said body having a hole in front of and outside the projected area of the blade, a blade lock slidably received in said hole, said blade lock having a body with a nose projecting out over the blade, said nose being relieved on the side adjacent the bit in back of its forward end so the engagement with the blade is at the forward end of the nose, the body of the blade lock having within said hole an inclined surface diverging from the blade on the side of the body opposite the blade, a wedge slidably received in said hole and having a surface mating with said inclined surface, and a screw for moving the wedge along said inclined surface.

6. A cutting tool comprising a body having an end seat for a symmetrical polygonal blade and two side seats outstanding from the end seat and engaging adjacent sides of a symmetrical polygonal blade seated on said end seat, said body having a hole in front of said end seat and outside the projected area of the end seat, a blade lock slidably received in said hole, said blade lock having a body with a nose projecting out over the blade, said nose being relieved on the side adjacent the bit in back of its forward end so the engagement with the blade is at the forward end of the nose, the body of the blade lock having within said hole an inclined surface diverging from the blade on the side of the body opposite the blade, a wedge slidably received in said hole and having a surface mating with said inclined surface, and a screw for moving the wedge along said inclined surface.

No references cited.